United States Patent [19]

Matsumura et al.

[11] 3,789,115

[45] Jan. 29, 1974

[54] PROCESS FOR PREPARING A HIGHLY SELECTIVE CATALYST USED IN THE PRODUCTION OF HYDROGEN PEROXIDE

[75] Inventors: Shiro Matsumura; Hiroshi Shin; Junichiro Sugano; Tadashi Yoshii; Yasuhisa Kuriyama; Takeshi Komaki, all of Yokkaichi, Japan

[73] Assignee: Mitsubishi Gas Chemical Company, Inc., Tokyo, Japan

[22] Filed: July 14, 1971

[21] Appl. No.: 162,616

Related U.S. Application Data

[63] Continuation of Ser. No. 864,524, Oct. 7, 1969, abandoned.

[30] Foreign Application Priority Data

Oct. 14, 1968 Japan.................................. 43-74206

[52] U.S. Cl............................ 423/588, 252/466 PT
[51] Int. Cl......................... C01b 15/02, B01j 11/08
[58] Field of Search...... 23/207, 252/466 B, 466 J, 252/466 PT, 473; 423/588, 589

[56] References Cited
UNITED STATES PATENTS 2,657,980  11/1953  Sprauer.................................. 23/207
3,328,128   6/1967  Kabisch................................. 23/207
3,408,165  10/1968  Franchuk et al....................... 23/207
2,983,584   5/1961  Sancelme.............................. 23/207

Primary Examiner—Oscar R. Vertiz
Assistant Examiner—Hoke S. Miller
Attorney, Agent, or Firm—Sughrue, Rothwell, Mion, Zinn & Macpeak

[57] ABSTRACT

In a process for the hydrogenation of an anthraquinone to the corresponding anthrahydroquinone in the production of hydrogen perioxide comprising hydrogenating said anthraquinone, oxidizing the resulting anthrahydroquinone and extracting hydrogen peroxide, the step comprising conducting said hydrogenation in the presence of a selective hydrogenation catalyst consisting essentially of a member selected from the group consisting of palladium black, palladium supported on a carrier, nickel, a palladium compound and a palladium compound supported on a carrier, wherein said catalyst has been treated with hydrogen or a molecular hydrogen containing gas at a temperature of from 150° to 650°C and for a period of time of from 10 to 240 minutes.

8 Claims, No Drawings

PROCESS FOR PREPARING A HIGHLY SELECTIVE CATALYST USED IN THE PRODUCTION OF HYDROGEN PEROXIDE

CROSS-REFERENCE TO RELATED APPLICATION

The present application is a continuation of U.S. Application Ser. No. 864,524, filed October 7, 1969, entitled "Process for Preparing a Highly Selective Catalyst Used in the Production of Hydrogen Peroxide," and now abandoned.

BACKGROUND OF THE INVENTION

1. Field of the Invention

This invention relates to a process for hydrogenating an anthraquinone to the corresponding anthrahydroquinone in the presence of a catalyst.

More particularly it relates to a hydrogenation process wherein a highly selective hydrogenation catalyst is used in the production of hydrogen peroxide through a cyclic operation involving the hydrogenation of an anthraquinone and the oxidation of the resultant anthrahydroquinone.

2. Description of the Prior Art

In the production of hydrogen peroxide through the cyclic operation, an anthraquinone as the reaction medium is hydrogenated in the presence of catalyst to the corresponding anthrahydroquinone. In the cyclic operation, the anthraquinone is also partly converted to degraded substances by side reactions, which are no more able to produce hydrogen peroxide under normal conditions of the operation.

The degraded substances are, for example, tetrahydroanthraquinones (I), oxyanthrones (II), anthrones (III) and other inactive substances:

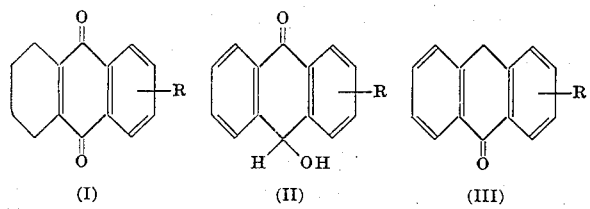

(I)    (II)    (III)

wherein R is an alkyl group.

The oxidation velocity of either a tetrahydroanthrahydroquinone or an oxyanthrone is markedly slower than that of the corresponding anthrahydroquinone, and the anthrones and the other inactive substances are unable to produce any more hydrogen peroxide.

There have been some proposals for the prevention of the degradation of the anthraquinones, but no sufficiently effective process has yet been found.

The present inventors have found that the formation of the undesirable compounds can be prevented, if a catalyst prepared by the process described below is used in the hydrogenation of an anthraquinone.

An object of this invention is to provide a palladium or a nickel catalyst which has an improved selectivity in the hydrogenation of anthraquinones, and hardly causes undesirable side-reactions such as hydrogenation of the anthraquinone nucleus, dehydrative reduction or rearrangement of anthraquinones.

A further object of the present invention is to provide an anthraquinone process for producing hydrogen peroxide wherein the loss of the production medium during the cyclic operation is substantially smaller than in conventional processes.

SUMMARY OF THE INVENTION

According to the process of the present invention, an anthraquinone is hydrogenated to the corresponding anthrahydroquinone using a highly selective hydrogenation catalyst prepared by treating a substance selected from the group consisting of palladium black, metallic palladium supported on a carrier, a palladium compound, a palladium compound supported on a carrier and nickel, in hydrogen or a molecular hydrogen-containing gas at a temperature of 150°–650°C.

DESCRIPTION OF THE PREFERRED EMBODIMENTS

The selectivities of the catalyst employed in the process of the present invention in the hydrogenation of an anthraquinone in the production of hydrogen peroxide are given in Table 2 below.

Table 1 shows the conditions of treatment of various catalysts with hydrogen gas for the preparation of the catalysts employed in the process of the present invention.

TABLE 1

| Catalyst | Temp. (°C) | Time (min.) |
|---|---|---|
| (a) Palladium black | 150–350 | 10–60 |
| (b) Pd-Al$_2$O$_3$ | 150–650 | 10–240 |
| (c) Pd-CaO·Al$_2$O$_3$ | 150–650 | 10–240 |
| (d) Raney nickel | 200–300 | 10–120 |

Table 2 illustrates the selectivity of the catalysts in the hydrogenation of an anthraquinone at 40°C under a hydrogen gas pressure of 1 kg/cm$^2$. The molar ratios of the tetrahydroanthraquinone to the corresponding anthrahydroquinone formed after a certain cyclic operation with different treated and untreated catalysts are indicated.

TABLE 2

| Catalyst | Untreated Catalyst | Treated Catalyst |
|---|---|---|
| (a) Palladium black | 1/250 | 1/1000–1/2000 |
| (b) Pd-Al$_2$O$_3$ | 1/300 | 1/1300–1/2300 |
| (c) Pd-CaO·Al$_2$O$_3$ | 1/900 | 1/2000–1/2500 |
| (d) Raney nickel | 1/90 | 1/100–1/1600 |

As is obvious from Table 2, the catalyst prepared as indicated above and employed in the process of the present invention possesses an improved selectivity and markedly prevents the side-reaction of the hydrogenation of the anthraquinone nucleus, and also prevents further degradation of the anthraquinone. Consequently, the loss of the reaction medium during the cyclic operation for the production of hydrogen peroxide is greatly decreased.

The hydrogenation velocity of an anthraquinone in the presence of the catalyst employed in the present invention is somewhat decreased as the temperature of the catalyst treatment increases. Temperatures as high as 350°C and 650°C, respectively, for palladium black and Raney nickel, and palladium supported on a carrier should be avoided in the treatment of the catalyst in hydrogen, as these high temperatures make the catalyst substantially inactive.

Thus, in the process of the present invention, the optimum conditions of the treatment with hydrogen gas depend on the type of catalysts. Normally, in the case of palladium black, metallic palladium supported on carrier, and Raney nickel leached with NaOH, treatment at 150°–350°C for 10–60 min., at 150°–650°C for 10–240 min. and at 200°–350°C for 10–120 min. are respectively preferable.

The process of the present invention will be further illustrated by reference to the following non-limiting examples.

EXAMPLE 1

177.6 g. of palladium chloride and 117 g. of sodium chloride were dissolved in 10 liters of water. Into this solution, 180 g. of a 37 percent formaldehyde aqueous solution was added dropwise at a temperature of 90°C while the pH of the solution was being adjusted to 10 ± 0.5 by the addition of a 4% NaOH aqueous solution. After the addition of the formaldehyde solution, the resulting mixture was stirred at 90°C for about 30 minutes. The palladium black thus precipitated was separated from the mother liquor, washed with 10 liters of deionized water and dried at 80°C under reduced pressure. The palladium black prepared was placed in a tube and heated to 275°C after replacing the air within the tube with nitrogen gas.

After hydrogen gas had been passed through the tube for 30 minutes at the above temperature, the hydrogen was replaced with nitrogen and the tube was cooled to room temperature.

A working solution was prepared by dissolving 2-amylanthraquinone at a concentration of 278 g/l in a mixture of trimethylbenzene and diisobutylcarbinol in a ratio of 50:50 by volume. To this solution was added the palladium black in a concentration of 10 g/l. With the working solution, the cyclic operation involving the hydrogenation of the anthraquinone with hydrogen gas at 40°C under a pressure of 1 kg/cm², the oxidation of the resultant anthrahydroquinone and the extraction of hydrogen peroxide was repeated in a bench scale plant. After 30 days of continuous operation with replacement of spent catalyst with fresh catalyst in an amount of 1/10 of the whole amount of the catalyst in the system per day, the molar ratios of 2-amyltetrahydroanthrahydroquinone, 2-amylanthrone and other inactive substances to 2-amylanthrahydroquinone were 1/1600, 1/4800 and below 1/10000, respectively. With an untreated palladium black catalyst, the corresponding molar ratios in a similar operation were 1/250, 1/3100 and 1/1400 respectively.

EXAMPLE 2

100 g. of an active alumina having a particle size of 100–200 mesh was immersed in 150 ml of deionized water and boiled with stirring. To the resulting solution was slowly added dropwise 50 g. of a CaPdCl₄ aqueous solution containing 2% Pd at 80°–90°C. The mixture solution was stirred for about 30 minutes and then cooled to room temperature. After the pH of the solution had been adjusted to 10 by the addition of a 4 percent NaOH aqueous solution, the solution was stirred for 30 minutes, and the precipitate formed was filtered and washed with deionized water. The Pd-CaO·Al₂O₃ thus prepared was dried at 80°C under reduced pressure, calcined at 500°C for two hours, and then was placed in a tube. Hydrogen gas was passed through the tube at 275°C for one hour. After the hydrogen gas had been replaced with nitrogen, the Pd catalyst in the tube was cooled to room temperature.

Results of a cyclic operation in a similar manner as in Example 1 were as follows: the molar ratios of 2-amyltetrahydroanthrahydroquinone and 2-amyloxyanthrone to 2-amylanthrahydroquinone were 1/2500 and 1/1250 respectively with the treated catalyst, whereas with an untreated catalyst having the same composition, the corresponding molar ratios were 1/2000 and 1/620.

EXAMPLE 3

100 g. of an active alumina having a particle size of 100–200 mesh was immersed in 150 ml of deionized water and boiled with stirring. To the resulting solution was slowly added dropwise 50 g. of a Na₂PdCl₄ aqueous solution containing 2% Pd at 80°–90°C. The mixture solution was stirred for about 30 minutes, and then 3 ml of a 37% HCHO aqueous solution was added. After the pH of the solution had been adjusted to 10±0.5 by the addition of a 4% NaOH aqueous solution, the solution was stirred for about 30 minutes. The precipitate formed was filtered, washed with 10 l of deionized water, and dried at 80°C under reduced pressure. The Pd-Al₂O₃ thus prepared was placed in a tube. Hydrogen gas was passed through the tube at 300°C for one hour. After the hydrogen gas had been replaced with nitrogen, the catalyst in the tube was cooled to room temperature.

Results of a cyclic operation in a similar manner as in Example 1 were as follows: the molar ratio of 2-amyltetrahydroanthrahydroquinone to 2-amylanthrahydroquinone was 1/2300 with the treated catalyst, whereas with an untreated catalyst, the corresponding molar ratio was 1/1300. No essential difference was found regarding the formation of oxyanthrone, anthrone and other inactive substances whether the untreated or treated catalyst was employed.

EXAMPLE 4

100 g. of a Ni-Al alloy consisting of nickel and aluminum in a 50:50 ratio by weight was added to 400 ml of a 20% NaOH aqueous solution over a period of 45 minutes at a temperature of below 50°C. After the generation of hydrogen gas had ceased, the precipitate formed was washed with deionized water until the pH of the waste water decreased below 10, and then it was treated with ethanol to replace the water involved within the precipitate. The Raney nickel catalyst thus prepared was placed in a U-tube, and heated gradually in a nitrogen atmosphere until the ethanol was substantially evaporated. Hydrogen gas was passed through the U-tube at 250°C for 30 minutes, and the hydrogen gas in the tube was replaced with nitrogen thereafter. The Ni catalyst thus prepared was cooled to room temperature and taken out from the U-tube in ethanol so that contact of the catalyst with air was avoided.

Results of a cyclic operation in a similar manner as in Example 1 were as follows: the molar ratios of 2-amyltetrahydroanthrahydroquinone, 2-amylanthrone and other inactive substances to 2-amylanthrahydroquinone were 1/1600, below 1/10000 and below 1/10000, respectively, with the treated catalyst; whereas with an untreated catalyst, the molar ratios were 1/90, 1/420 and 1/320, respectively.

EXAMPLE 5

100 g. of a magnesia-alumina having a particle size of 100–200 Tyler's mesh was immersed in 150 ml of deionized water and boiled with stirring. To the solution was slowly added dropwise 50 g of a $Na_2PdCl_4$ aqueous solution containing 2% Pd at 80°–90°C. The mixture solution was stirred for about 30 minutes, and then cooled to room temperature. After 3 ml of a 37% HCHO aqueous solution had been added to the solution, and the pH of the solution had been adjusted to 10 ± 0.5 by the addition of a 4% NaOH aqueous solution, the solution was stirred for about 30 minutes. The precipitate formed was filtered, washed with 10 liters of deionized water, and dried at 80°C under reduced pressure. The $Pd-MgO \cdot Al_2O_3$ thus prepared was placed in a tube. Hydrogen gas was passed through the tube at 500°C for 30 minutes. After the hydrogen gas had been replaced with nitrogen, the catalyst in the tube was cooled to room temperature.

Results of a cyclic operation in a similar manner as in Example 1 were as follows: the molar ratio of 2-amyltetrahydroanthrahydroquinone to 2-amylanthrahydroquinone was 1/2000 with the treated catalyst, whereas with an untreated catalyst, the corresponding molar ratio was 1/1000.

What is claimed is:

1. In a process for the hydrogenation of an anthraquinone to the corresponding anthrahydroquinone in a cyclic process for producing hydrogen peroxide which comprises hydrogenating said anthraquinone to said corresponding anthrahydroquinone, oxidizing said anthrahydroquinone and recovering hydrogen peroxide, the improvement which comprises conducting said hydrogenation in the presence of a catalyst selected from the group consisting of metallic palladium supported on a carrier, a palladium compound and a palladium compound supported on a carrier, said catalyst having been prepared by reducing a palladium compound with aqueous formaldehyde and, after drying, subjecting the catalyst to an after-treatment with hydrogen or a molecular hydrogen-containing gas at a temperature of from 150° to 650°C.

2. The process of claim 1 wherein said hydrogenation is conducted at a temperature of about 40°C and at a pressure of about 1 $kg/cm^2$.

3. The process of 1 wherein said after-treatment is conducted for from 10 to 240 minutes.

4. The process of claim 1 wherein said catalyst is prepared by reducing a water-soluble palladium compound with aqueous formaldehyde, drying the resulting catalyst under reduced pressure and then subjecting said catalyst to said after-treatment.

5. In a process for the hydrogenation of an anthraquinone to the corresponding anthrahydroquinone in a cyclic process for producing hydrogen peroxide which comprises hydrogenating said anthraquinone to said corresponding anthrahydroquinone, oxidizing said anthrahydroquinone and recovering hydrogen peroxide, the improvement which comprises conducting said hydrogenation in the presence of palladium black as a catalyst, said catalyst having been prepared by reducing a palladium compound with aqueous formaldehyde, and, after drying, subjecting the catalyst to an after-treatment with hydrogen or a molecular hydrogen-containing gas at a temperature of from 150° to 350°C.

6. The process of claim 5 wherein said after-treatment is conducted for from 10 to 60 minutes.

7. The process of claim 5 wherein said hydrogenation is conducted at a temperature of about 40°C. and at a pressure of about 1 $kg/cm^2$.

8. The process of claim 5 wherein said catalyst is prepared by reducing a water-soluble palladium compound with aqueous formaldehyde, drying the resulting catalyst under reduced pressure and subsequently subjecting said catalyst to said after-treatment.

* * * * *